United States Patent
Amano et al.

(10) Patent No.: US 10,713,772 B2
(45) Date of Patent: Jul. 14, 2020

(54) MEASUREMENT PROCESSING DEVICE, SUBSTRATE PROCESSING SYSTEM, MEASUREMENT JIG, MEASUREMENT PROCESSING METHOD, AND STORAGE MEDIUM

(71) Applicant: Tokyo Electron Limited, Tokyo (JP)

(72) Inventors: Yoshifumi Amano, Kumamoto (JP); Yuki Ito, Kumamoto (JP); Eiichiro Okamoto, Kumamoto (JP); Kazuya Iwanaga, Kumamoto (JP); Ryoji Ikebe, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 297 days.

(21) Appl. No.: 14/950,016

(22) Filed: Nov. 24, 2015

(65) Prior Publication Data
US 2016/0148366 A1 May 26, 2016

(30) Foreign Application Priority Data
Nov. 26, 2014 (JP) .................................. 2014-238697

(51) Int. Cl.
*G06T 7/00* (2017.01)
*G06T 7/62* (2017.01)

(52) U.S. Cl.
CPC .............. *G06T 7/0008* (2013.01); *G06T 7/62* (2017.01); *G06T 2207/30148* (2013.01)

(58) Field of Classification Search
CPC ..................... G06T 7/0008; G06T 7/62; G06T 2207/30148
See application file for complete search history.

(56) References Cited

U.S. PATENT DOCUMENTS

| 2013/0000558 | A1* | 1/2013 | Hara ...................... C23C 16/16 118/724 |
| 2013/0206726 | A1* | 8/2013 | Oono ................ H01L 21/67253 216/85 |
| 2013/0271839 | A1* | 10/2013 | Nishimura ............... G02B 5/28 359/578 |
| 2014/0220712 | A1* | 8/2014 | Okabe .............. H01L 21/67115 438/15 |
| 2014/0347464 | A1* | 11/2014 | Yada .................... B05O 5/0254 348/86 |

FOREIGN PATENT DOCUMENTS

| JP | 2003017547 A | * | 1/2003 |
| JP | 2003017547 A | * | 1/2003 |
| JP | 2011243627 A | * | 12/2011 |
| JP | 2013-110270 A | | 6/2013 |
| JP | 2013-168429 A | | 8/2013 |
| JP | 5372836 B | | 12/2013 |

* cited by examiner

*Primary Examiner* — Jamie J Atala
*Assistant Examiner* — Hesham K Abouzahra
(74) *Attorney, Agent, or Firm* — Abelman, Frayne & Schwab

(57) ABSTRACT

Disclosed is a measurement processing device including: a processing unit configured to control an imaging device to image a substrate, on which a processing film is removed from the peripheral edge portion, and an enclosure member that surrounds the substrate. A captured image obtained by the imaging device is processed to measure a cut width in which the processing film is absent in the peripheral edge portion of the substrate, and a gap width between a peripheral edge end of the substrate and the enclosure member.

21 Claims, 8 Drawing Sheets

FIG. 13
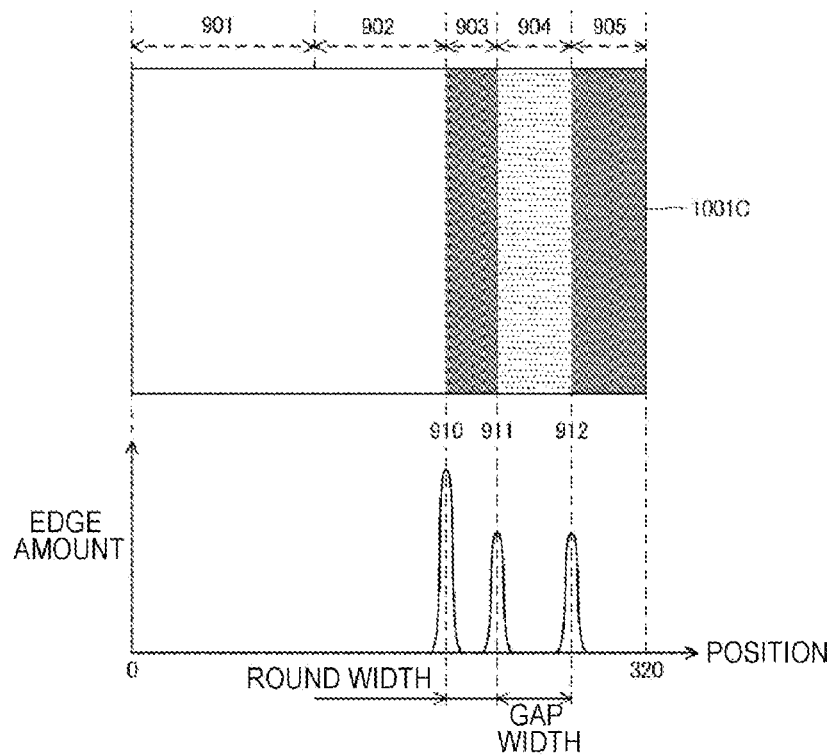
FIG.14A        FIG.14B        FIG.14C
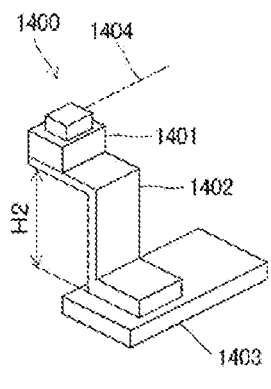 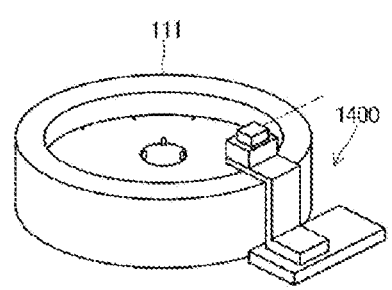 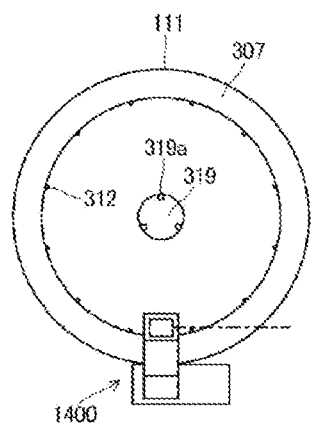

MEASUREMENT PROCESSING DEVICE, SUBSTRATE PROCESSING SYSTEM, MEASUREMENT JIG, MEASUREMENT PROCESSING METHOD, AND STORAGE MEDIUM

CROSS-REFERENCE TO RELATED APPLICATIONS

This application is based on and claims priority from Japanese Patent Application No. 2014-238697, filed on Nov. 26, 2014, with the Japan Patent Office, the disclosure of which is incorporated herein in its entirety by reference.

TECHNICAL FIELD

The present disclosure relates to a substrate processing apparatus in which a substrate such as a semiconductor wafer is processed with a processing liquid.

BACKGROUND

A substrate processing system including a single type substrate processing apparatus has been known. This type of system may include a substrate processing apparatus that holds a substrate which has a film formed on its surface, rotates the substrate around a vertical axis, and supplies a processing liquid from a nozzle to a peripheral edge portion of the substrate to thereby remove the film at the peripheral edge portion of the substrate. Hereinafter, the substrate processing apparatus will be referred to as a first substrate processing apparatus. In Japanese Patent Laid-Open Publication No. 2013-168429, an imaging mechanism is provided in the substrate processing system to capture an image of the peripheral edge portion of the substrate processed by the first substrate processing apparatus, and based on the captured image, it is determined whether the film of the peripheral edge portion is properly removed. Meanwhile, apart from the first substrate processing apparatus, there is known a substrate processing apparatus including an enclosure member that holds a peripheral edge portion of a substrate from a lower side and surrounds the whole peripheral edge portion of the substrate, and processes the substrate held by the enclosure member. Hereinafter, the substrate processing apparatus will be referred to as a second substrate processing apparatus. See, for example, Japanese Patent No. 5372836.

SUMMARY

According to an aspect, the present disclosure provides a measurement processing device including: a processing unit configured to control an imaging device to image a substrate, on which a processing film is removed from the peripheral edge portion, and an enclosure member that surrounds the substrate. A captured image obtained by the imaging device is processed to measure a cut width in which the processing film is absent in the peripheral edge portion of the substrate, and a gap width between a peripheral edge end of the substrate and the enclosure member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 13 is a schematic view illustrating a first captured image that is captured under a first imaging condition.

FIGS. 14A to 14C are views illustrating a shape of a measurement jig 1400 in a second exemplary embodiment.

DETAILED DESCRIPTION

Figure 1:
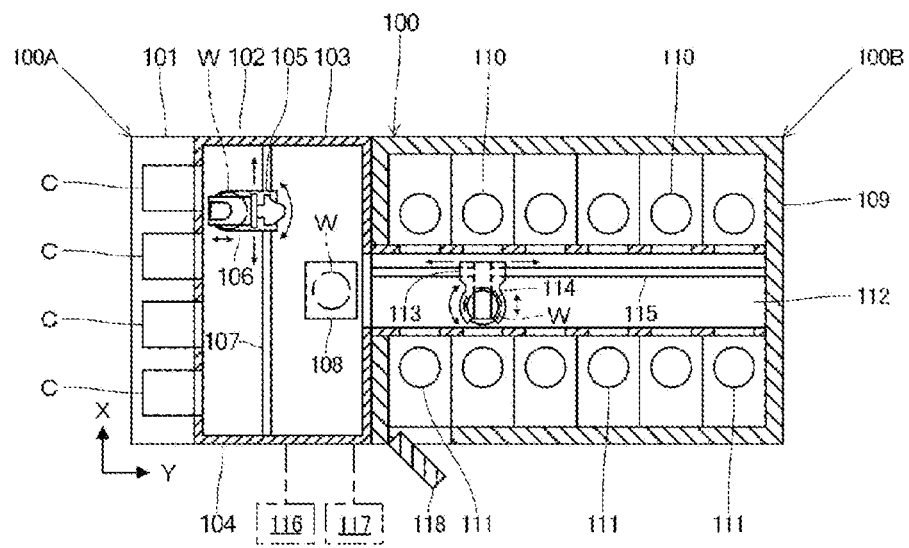
FIG. 1 is a plan view illustrating a schematic configuration of a substrate processing system 100.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

For example, in a case where the substrate processing system includes both of the first substrate processing apparatus and the second substrate processing apparatus, an imaging mechanism is required to confirm whether the substrate is correctly held by the enclosure member in the second substrate processing apparatus, separately from the imaging mechanism for confirming the first substrate processing apparatus. If the confirmation operation is performed by individually providing two imaging mechanisms, it may cause an enlargement of the system, and it may takes a long time for the confirmation operation.

The present disclosure is contrived to solve the aforementioned problem and enables to confirm a film removal state of the substrate and a holding state of the enclosure member in a short time without causing the enlargement of the system.

In order to solve the aforementioned problem, the present disclosure provides a measurement processing device including: a processing unit configured to control an imaging device to image a substrate, on which a processing film is removed from the peripheral edge portion, and an enclosure member that surrounds the substrate. A captured image obtained by the imaging device is processed to measure a cut width in which the processing film is absent in the peripheral edge portion of the substrate, and a gap width between a peripheral edge end of the substrate and the enclosure member.

In the above-mentioned measurement processing device, the cut width and the gap width are measured by specifying, from the captured image, at least a boundary between a plane region where the processing film is removed and a plane region where the processing film is not removed, the peripheral edge end of the substrate, and a boundary of the enclosure member.

In the above-mentioned measurement processing device, the peripheral edge end of the substrate, and the boundary of the enclosure member, are specified from a first captured image obtained by imaging under a first imaging condition of the imaging device, and the boundary between the plane region where the processing film is removed and a round region that is formed in the peripheral edge end of the substrate, and the boundary between the plane region where the processing film is removed and the plane region where the processing film is not removed, are specified by imaging under a second imaging condition of the imaging device.

In the above-mentioned measurement processing device, the second imaging condition is a condition to obtain a brighter image than that captured under the first imaging condition.

In the above-mentioned measurement processing device, the measurement processing device causes the first and second captured images, and measurement values of the cut width and the gap width to be displayed on a display unit of an information processing device.

In the above-mentioned measurement processing device, a plurality of the imaging devices are provided at a plurality of positions along a peripheral edge direction of the substrate, and a plurality of captured images obtained by the plurality of imaging devices that perform imaging at the plurality of positions, respectively, are used for measurement.

In the above-mentioned measurement processing device, the imaging device is provided at a single position along a peripheral edge direction of the substrate, and a plurality of captured images obtained by the imaging device that is provided at the single position and performs imaging at a plurality of positions of the substrate in accordance with rotation of the enclosure member, are used for measurement.

Further, the present disclosure provides a substrate processing system including: a first substrate processing apparatus including an enclosure member that surrounds the substrate, and configured to process a substrate; an imaging device provided above the enclosure member, and configured to image the substrate, on which a processing film is removed from the peripheral edge portion, and the enclosure member; and a measurement processing device configured to process a captured image obtained by the imaging device to thereby measure a cut width in which the processing film is absent in the peripheral edge portion of the substrate, and a gap width between a peripheral edge end of the substrate and the enclosure member.

In the above-mentioned system, the first substrate processing apparatus is a device that processes a bottom surface of the substrate held by the enclosure member. The substrate, on which the processing film is removed from the peripheral edge portion, is carried in from the outside of the first substrate processing apparatus.

The above-mentioned system further includes a second substrate processing apparatus configured to remove the processing film by supplying a processing liquid to the peripheral edge portion of the film-formed substrate. The substrate, on which the processing film is removed from the peripheral edge portion, is a substrate that is processed in the second substrate processing apparatus and then carried into the first substrate processing apparatus.

In the above-mentioned system, the first processing apparatus further includes a lifting member that liftably supports the substrate from the bottom surface. The lifting member moves up to a position that is higher than the enclosure member and lower than the imaging device to thereby receive the substrate that is carried in from the outside of the first processing apparatus, and moves down from the receiving position to thereby place the substrate on the enclosure member.

In the above-mentioned system, a plurality of the imaging devices are provided at a plurality of positions along a peripheral edge direction of the substrate, and the plurality of imaging devices perform imaging at the plurality of positions, respectively, to acquire a plurality of captured images to be processed by the measurement processing device.

In the above-mentioned system, the imaging device is provided at a single position along a peripheral edge direction of the substrate, and the imaging device provided at the single position performs imaging at a plurality of positions of the substrate in accordance with rotation of the enclosure member to acquire a plurality of captured images to be processed by the measurement processing device.

Further, the present disclosure provides a measurement jig for use in a substrate processing apparatus including an enclosure member that surrounds a whole peripheral edge portion of a substrate. The measurement jig includes a mounting table having a mounting surface with respect to the substrate processing apparatus; and an imaging device fixed on the mounting table. The imaging device is configured to capture an image from which a cut width in which the processing film is absent in the peripheral edge portion of the substrate, and a gap width between a peripheral edge of the substrate and the enclosure member are measurable, in a state where the substrate, on which a processing film is removed from the peripheral edge portion is held by the enclosure member, and the mounting table is fixed to the substrate processing apparatus.

In the above-mentioned measurement jig, the mounting table and the imaging device are spaced apart from each other at least to the extent that a lifting member provided in the substrate processing apparatus receives the substrate carried in from the outside of the substrate processing apparatus and moves down to place the substrate on the enclosure member.

In the above-mentioned measurement jig, a plurality of the imaging devices are provided at a plurality of positions along a peripheral edge direction of the substrate, respectively.

In the above-mentioned measurement jig, the imaging device is provided at a single position along a peripheral edge direction of the substrate.

Further, the present disclosure provides a measurement processing method including: an imaging process of imaging, above an enclosure member that surround a substrate, the substrate, on which a processing film is removed from the peripheral edge portion, and the enclosure member; and a measurement processing process of measuring a cut width in which the processing film is absent in the peripheral edge portion of the substrate, and a gap width between a peripheral edge of the substrate and the enclosure member by processing a captured image obtained in the imaging process.

In the above-mentioned method, in the imaging process, a plurality of captured images to be processed in the measurement processing process by performing imaging at a plurality of positions along a peripheral edge direction of the substrate by using a plurality of imaging devices provided at the plurality of positions, respectively.

In the above-mentioned method, in the imaging process, a plurality of captured images to be processed in the measurement processing process is acquired by performing imaging at a plurality of positions of the substrate in accordance with rotation of the enclosure member processing of the captured image by using a single imaging device provided at a single position along a peripheral edge direction of the substrate.

Further, the present disclosure provides a non-transitory computer-readable storage medium stored with a program in which, when executed, cause a computer to execute the measurement processing method.

According to the present disclosure, it is possible to confirm a film removal state of the substrate and a holding state of the enclosure member in a short time without causing the enlargement of the system.

First Exemplary Embodiment

Hereinafter, exemplary embodiments of the present disclosure will be described with reference to FIGS. 1 to 15.

On a wafer W (substrate) to be processed by a substrate processing apparatus according to the present exemplary embodiment, for example, a metal monolayer film (e.g., TiN, Al, or W) is formed by a predetermined coating processing. Hereinafter, the film will be referred to as a "processing film" in the present exemplary embodiment. The processing film is formed on the top surface of the wafer W. Here, the substrate processing system includes a first substrate processing apparatus that has a function to remove a film of the entire bottom surface by supplying a processing liquid to the wafer W, and a second substrate device that has a function to remove a film positioned in a peripheral edge portion of the top surface of the wafer W in the processing film formed on the wafer W. First, descriptions will be made on a substrate processing system 100 that has the functions with reference to FIG. 1.

Meanwhile, the top surface or the bottom surface of the wafer W is a surface facing up or down when the wafer W is horizontally held by a substrate holding unit to be described below. Further, the peripheral edge portion of the wafer W refers to a region around the side end of the wafer W, that is, a region where a circuit pattern of a semiconductor device is not formed.

FIG. 1 is a plan view illustrating a schematic configuration of the substrate processing system 100. As illustrated in FIG. 1, the substrate processing system 100 includes a carry-in/out station 100A in which a wafer carrier C accommodating a plurality of wafers W is provided to perform carry-in/out of the wafers W, and a processing station 100B that performs a liquid processing of the wafers W. The carry-in/out station 100A and the processing station 100B are provided adjacent to each other.

The carry-in/out station 100A includes a carrier placing unit 101, a conveyance unit 102, a delivery unit 103, and a housing 104. In the carrier placing unit 101, the wafer carrier C configured to accommodate a plurality of wafers W in a horizontal state is placed. In the conveyance unit 102, the conveyance of the wafers W is performed, and in the delivery unit 103, the delivery of the wafers W is performed. The conveyance unit 102 and the delivery unit 103 are accommodated in the housing 104.

The conveyance unit 102 includes a conveyance mechanism 105. The conveyance mechanism 105 includes a wafer holding arm 106 configured to hold a wafer W, and a mechanism configured to move the wafer holding arm 106 forward and backward. Although not illustrated, the conveyance mechanism 105 further includes a mechanism configured to move the wafer holding arm 106 along a horizontal guide 107 extending in an X direction where the wafer carrier C is arranged, a mechanism configured move the wafer holding arm 106 along a vertical guide which is provided in a vertical direction, and a mechanism configured to rotate the wafer holding arm 106 in a horizontal plane. The wafer W is conveyed between the wafer carrier C and the delivery unit 103 by the conveyance mechanism 105.

The delivery unit 103 includes a delivery shelf 108 having a plurality of placing units on which the wafers W are placed. The delivery unit 103 is configured to deliver the wafers W between the delivery unit 103 and the processing station 100B through the delivery shelf 108.

The processing station 100B includes a housing 109, a plurality of substrate processing apparatuses 110 (second substrate processing apparatuses) and substrate processing apparatuses 111 (first substrate processing apparatuses) accommodated in the housing 109, a conveyance chamber 112, and a conveyance mechanism 113 provided in the conveyance chamber 112. Below the plurality of substrate processing apparatuses 110 and substrate processing apparatuses 111, a mechanism configured to supply a liquid or gas to each of the substrate processing apparatuses 110 and the substrate processing apparatuses 111 may be accommodated. In the present exemplary embodiment, a rectangular closed space in which each of the substrate processing apparatuses 110 and the substrate processing apparatuses 111 is present in FIG. 1 will be referred to as a "processing chamber".

The conveyance mechanism 113 includes a wafer holding arm 114 configured to hold the wafer W, and a mechanism configured to move the wafer holding arm 114 forward and backward. Although not illustrated, the conveyance mechanism 113 further includes a mechanism configured to move the wafer holding arm 114 in a Y direction along a horizontal guide 115 provided in the conveyance chamber 112, a mechanism configured to move the wafer holding arm 114 along a vertical guide provided in a vertical direction, and a mechanism configured to rotate the wafer holding arm 114 in a horizontal plane. The wafers W are carried into and out from each of the substrate processing apparatuses 110 and the substrate processing apparatuses 111 by the conveyance mechanism 113.

In the substrate processing system 100, a system controller 116 and an operation panel 117 are provided. The system controller 116 functions to control the entire substrate processing system 100 based on a control program stored in a built-in storage device (not illustrated). Further, the operation panel 117 is a touch panel type operation device that enables a user of the substrate processing system 100 to input various operation commands. In the substrate processing apparatus 111, a maintenance panel 118 (opening and closing type panel) is provided, and is an opening and closing type panel used to perform an operation or a confirmation in the processing chamber. FIG. 1 illustrates that one substrate processing apparatus 111 includes the maintenance panel 118. However, in the present exemplary embodiment, all twelve substrate processing apparatuses 110 and substrate processing apparatuses 111 include the maintenance panel 118.

The schematic configuration of the substrate processing apparatus 110 will be described in reference to FIG. 2. As illustrated, the substrate processing apparatus 110 includes a substrate holding unit 201 configured to horizontally hold the wafer W without contacting the peripheral edge portion of the wafer W, and a rotation drive unit 202 connected to a lower side of the substrate holding unit 201 and configured to rotate the substrate holding unit 201. The substrate processing apparatus 110 further includes a cup body 203 that is a ring-shaped member and laterally surrounds a lateral end of the wafer W.

Figure 2:
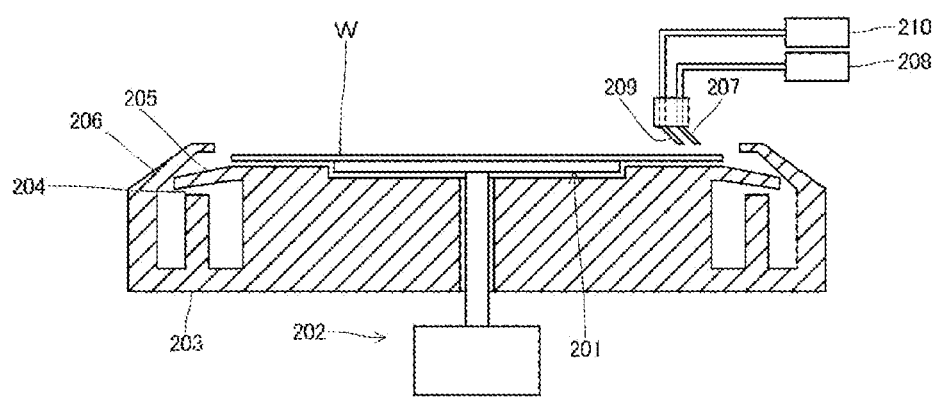
FIG. 2 is a view illustrating a schematic configuration of a substrate processing apparatus 110.

As illustrated in FIG. 2, inside the cup body 203, a groove 204 opened upward and extending in a circumferential direction is formed to discharge a gas generated during the liquid processing or a gas sent to the periphery of the wafer W to the outside. The cup body 203 includes a flange 205 that extends outwardly in the upper portion of the groove 204, and a cover 206 that extends above the flange 205. Among them, the flange 205 is configured to guide a liquid scattered from the wafer W or a flow of a gas around the wafer W into the cup body 203. Further, the cover 206 is configured to receive the liquid scattered from the rotating wafer W with its inner surface and guide the received liquid into the groove 204.

A structure of each component for performing the processing on the wafer W in the upper side will be described. As illustrated in FIG. 2, the chemical liquid nozzle 207 is a nozzle configured to supply a chemical liquid such as, for example, hydrofluoric acid (HF) or nitric acid ($HNO_3$) which is supplied from a chemical liquid supply unit 208. A rinse nozzle 209 supplies a rinse processing liquid such as, for example, deionized water (DIW) which is supplied from a rinse processing liquid supply unit 210. Meanwhile, a nozzle or a supply unit may be provided to perform the processing on the wafer W from the lower side.

Figure 3:
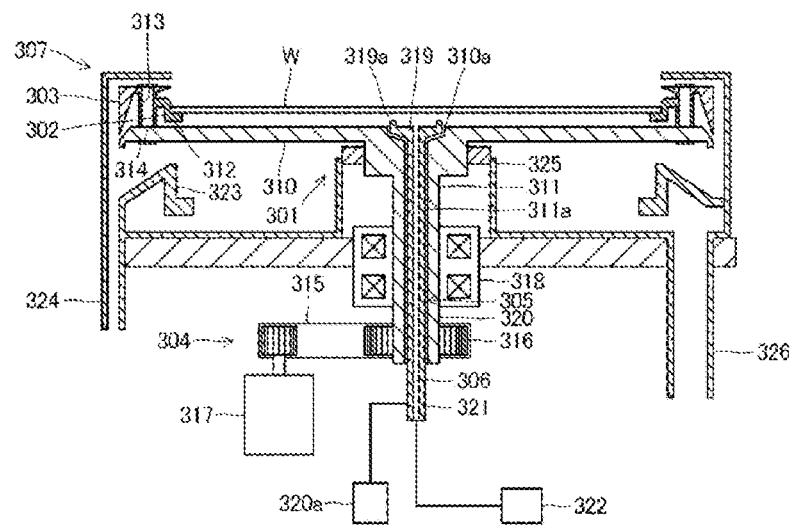
FIG. 3 is a schematic cross-sectional view illustrating a configuration of a substrate processing apparatus 111.
Figure 4:
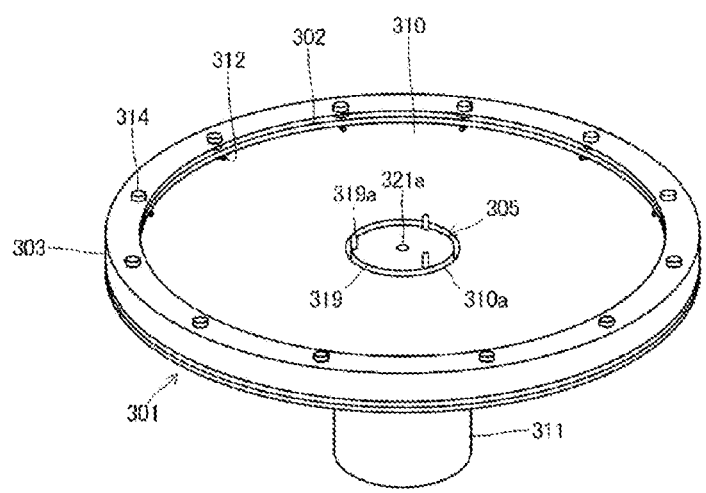
FIG. 4 is a perspective view illustrating the substrate processing apparatus 111 when viewed from the top.
Figure 5:
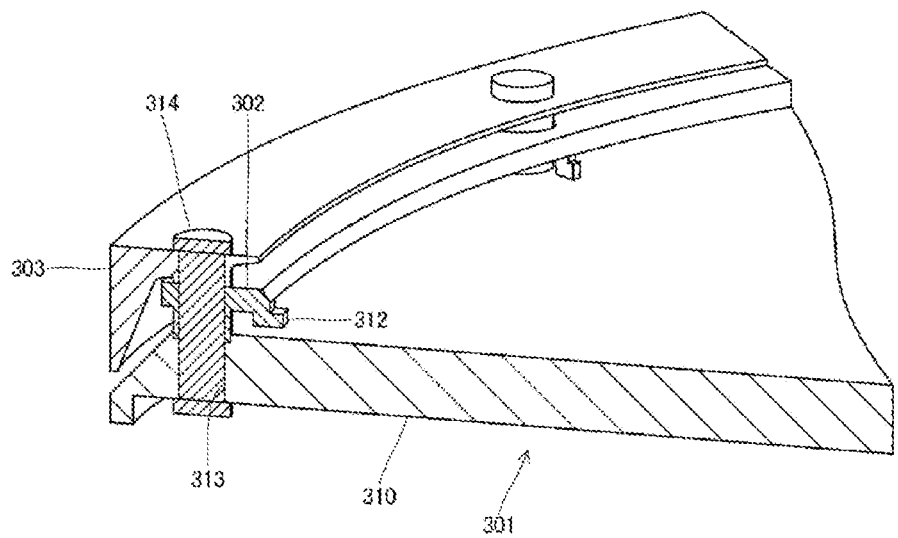
FIG. 5 is a view illustrating a periphery of a support pin 312 in an enlarged scale.

Next, the substrate processing apparatus 111 according to the present disclosure will be described with reference to FIGS. 3 to 5. FIG. 3 is a schematic cross-sectional view illustrating the configuration of the substrate processing apparatus 111. FIG. 4 is a perspective view thereof when viewed from the upper side. FIG. 5 is a view illustrating a peripheral area of a support pin (to be described later) in an enlarged scale.

As illustrated in FIG. 3, the substrate processing apparatus 111 includes a rotation plate 301, an enclosure member 302, a rotation cup 303, a rotation drive unit 304, a substrate lifting member 305, a processing liquid supply mechanism 306, and an exhaust/drain unit (cup) 307.

As illustrated in FIG. 4, the rotation plate 301 includes a base plate 310 and a rotation shaft 311. The base plate 310 is provided horizontally and includes a circular hole 310a at the center thereof. The rotation shaft 311 is provided to extend downwardly from the base plate 310 and has a cylindrical shape with a hole 311a formed at the center thereof.

As illustrated in FIGS. 2 to 4, the enclosure member 302 is provided outside the periphery of the wafer W so as to surround the entire peripheral edge portion of the wafer W. Further, the enclosure member 302 is rotatably provided and supports the wafer W from the lower side. The enclosure member 302 guides the processing liquid used for processing the wafer W to the drain cup 307, as illustrated in FIG. 3. Further, the enclosure member 302 includes a support pin 312. The support pin 312 is provided to protrude from the lower end of the enclosure member to an inner side of the periphery. The support pin 312 is a member on which the peripheral edge portion of the wafer W is placed. As the peripheral edge portion of the wafer W is placed on the support pin 312, the support pin 312 supports the peripheral edge portion of the wafer W from the lower side. Further, as illustrated in FIG. 4, a plurality of (twelve (12) in the present exemplary embodiment) support pins 312 are provided at substantially equal intervals along the circumferential direction of the wafer W. Further, in the present exemplary embodiment, the support pins 312 were provided in the enclosure member 302. Instead of this, however, support pins may be provided in the base plate 310 to support the wafer W from a lower side.

The rotation cup 303 is configured to suppress the processing liquid, which is supplied to the bottom surface side of the wafer W and scattered from the rotating wafer W to the outer peripheral side, from being rebound and returning to the wafer W. Further, the rotation cup 303 is also configured to suppress the processing liquid, which is scattered from the rotating wafer W to the outer peripheral side, from wrapping around to the top surface side of the wafer W.

As illustrated in FIG. 5, the base plate 310, the enclosure member 302, and the rotation cup 303 are fastened by fitting fastening members 314 to holes 313 formed through the respective components, respectively. Therefore, the base plate 310, the enclosure member 302, and the rotation cup 303 are provided to be integrally rotatable.

In FIG. 3, the rotation drive unit 304 includes a pulley 316, a driving belt 315, and a motor 317. The pulley 316 is arranged outside the periphery at the lower side of the rotation shaft 311. The driving belt 315 is wound around the pulley 316. The motor 317 is connected to the driving belt 315 and transmits a rotation driving force to the driving belt 315 to thereby rotate the rotation shaft 311 via the pulley 316. That is, the rotation drive unit 304 rotates the base plate 310, the enclosure member 302, and the rotation cup 303 by rotating the rotation shaft 311. Meanwhile, a bearing 318 is arranged outside the periphery of the rotation shaft 311.

The substrate lifting member 305 is provided in the hole 310a of the base plate 310 and the hole 311a of the rotation shaft 311 to be liftable, and includes a lift pin plate 319 and a lift shaft 320. The lift pin plate 319 includes a plurality of (e.g., three) lift pins 319a in its peripheral edge end. The lift shaft 320 extends downwardly from the lift pin plate 319. The lift pin plate 319 and the lift shaft 320 are provided with the processing liquid supply mechanism 306 at the centers thereof. Further, a cylinder mechanism 320a is connected to the lower end of the lift shaft 320, and, as the substrate lifting member 305 is moved up or down by the cylinder mechanism 320a, the wafer W is moved up or down, so that the loading or unloading of the wafer W is performed.

The processing liquid supply mechanism 306 includes a processing liquid supply pipe 321. The processing liquid supply pipe 321 is provided to extend vertically inside the lift pin plate 319 and the lift shaft 320 (in a hollow space). The processing liquid supply pipe 321 guides the processing liquid, which is supplied from each pipe of a processing liquid pipe group 322, to the bottom surface side of the wafer W. That is, the processing liquid supply pipe 321 supplies the processing liquid to the bottom surface of the wafer W. The processing liquid supply pipe 321 communicates with a processing liquid supply port 321a which is formed on the top surface of the lift pin plate 319.

The exhaust/drain unit (cup) 307 includes a drain cup 323, a drain pipe 324, an exhaust cup 325, and an exhaust pipe 326. Further, the exhaust/drain unit (cup) 307 includes an opening formed on the top surface thereof. The exhaust/ drain unit (cup) 307 is configured to recover a gas and a liquid discharged from a space mainly surrounded by the rotation plate 301 and the rotation cup 303.

The drain cup 323 receives the processing liquid guided by the rotation cup 303. The drain pipe 324 is connected to the outermost portion of the bottom of the drain cup 323 and discharges the processing liquid, which is received by the drain cup 323, through any one of pipes of a drain pipe group (not illustrated). The exhaust cup 325 is provided to communicate with the drain cup 323 outside or below the drain cup 323. FIG. 3 illustrates an example in which the exhaust cup 325 is provided to communicate with the drain cup 323 at an inward side and downward side of the peripheral edge of the drain cup 323. The exhaust pipe 326 is connected to the outermost portion of the bottom of the exhaust cup 325 and discharges a gas such as, for example, nitrogen gas in the exhaust cup 325 through any one of pipes of an exhaust pipe group (not illustrated).

<Measurement Jig>

Figure 6A:
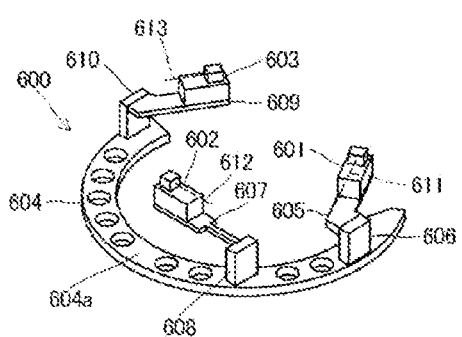
FIGS. 6A and 6B are views illustrating a shape of a measurement jig 600 in a first exemplary embodiment.
Figure 6B:
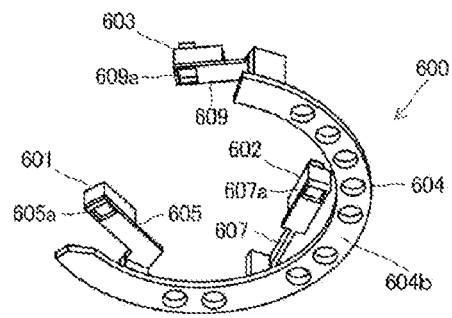

A shape of a measurement jig used in the present exemplary embodiment will be described with reference to FIGS. 6A and 6B. FIG. 6A is a perspective view of a measurement jig 600 when viewed from the upper side. FIG. 6B is a perspective view of the measurement jig 600 when viewed from the lower side.

As illustrated in FIG. 6A, the measurement jig 600 includes a first camera 601, a second camera 602, and a third camera 603. All the first to third cameras 601 to 603 are configured to capture an image of the peripheral edge portion of the wafer W.

A mounting table 604 is a semicircular member having a front surface 604a and a rear surface 604b. The first to third cameras 601 to 603 are fixed above the front surface 604a through, for example, a connecting portion. As illustrated in FIG. 6B, the rear surface 604b serves as a mounting surface to be mounted on the top surface of the exhaust/drain unit (cup) 307 of the substrate processing apparatus 111.

A first support member 605 supports the first camera 601 that is mounted on the top surface thereof, and includes an opening 605a at a position corresponding to an imaging sensor or light of the camera, as illustrated in FIG. 6B.

A first connecting member 606 is configured to interconnect the first support member 605 and the mounting table 604, and has an interval of a predetermined height H1 from the top surface of the mounting table 604 to the rear surface of the first support member 605 (see FIG. 7B) such that the wafer W may be carried in/out even after the first connecting member is mounted, as described later. Similarly, the second camera 602 and the third camera 603 also includes a second support member 607 and a second connecting member 608, a third support member 609 and a third connecting member 610, and an opening 607a and an opening 609a, respectively.

The first to third cameras 601 to 603 include first to third cables 611 to 613, respectively, in order to to receive a control signal of an imaging operation from the outside or to transmit a captured image to the outside. Although omitted in FIG. 6, the cables are connected to a measurement processing device 800 (to be described later).

Figure 7A:
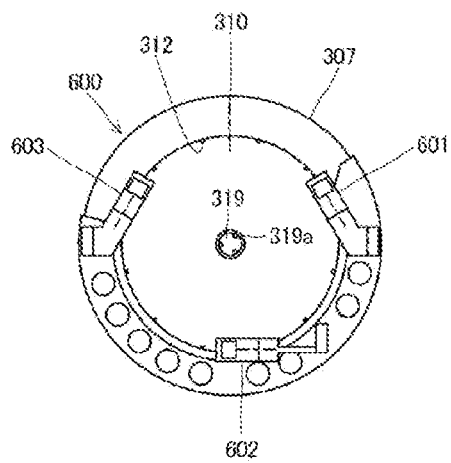
FIGS. 7A and 7B are views illustrating a state where the measurement jig 600 is installed in the substrate processing apparatus 111.
Figure 7B:
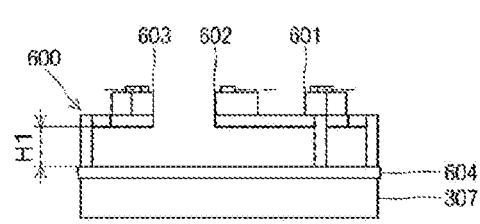

Descriptions will be made on a state where the measurement jig 600 is installed in the substrate processing apparatus 111, with reference to FIGS. 7A and 7B. FIG. 7A is a plan view illustrating a state where the measurement jig 600 is installed in the substrate processing apparatus 111, when viewed from the top side. FIG. 7B is a side view when viewed from the lateral side.

As illustrated in FIG. 7A, when the measurement jig 600 is properly installed, the first to third cameras 601 to 603 are arranged along the peripheral edge direction of the wafer W and positioned above the inner peripheral end of the exhaust/ drain unit (cup) 307. Here, the inner peripheral end of the enclosure member 302 slightly protrudes slightly beyond the inner peripheral end of the exhaust/drain unit (cup) 307 with respect to the inner side. Accordingly, although not illustrated in the figure, it is possible to capture not only an image of the support pin 312 but also an image of the inner peripheral end of the enclosure member 302.

As illustrated in FIG. 7B, the measurement jig 600 is installed on the top surface of the exhaust/drain unit (cup) 307 of the substrate processing apparatus 111. Since a distance from the top surface of the exhaust/drain unit (cup) 307 to the top surface of the wafer W is also determined, a distance from an imaging sensor of each camera to the wafer W is constant.

When installing the measurement jig 600, the measurement jig 600 may be fixed using a tool for mounting by a user of the system not to move from the top surface of the exhaust/drain unit (cup) 307.

<Measurement Processing System>

Figure 8:
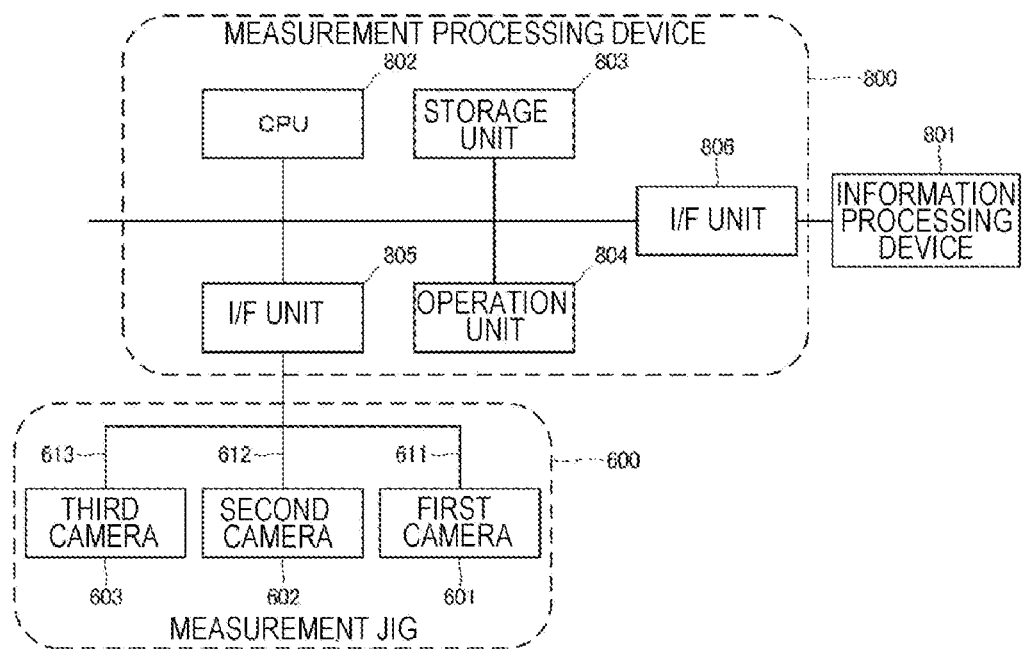
FIG. 8 is a view illustrating an entire configuration of a measurement system in the present exemplary embodiment.

The entire configuration of the measurement system in the present exemplary embodiment will be described with reference to FIG. 8. The measurement system is constituted with a measurement jig 600, a measurement processing device 800, and an information processing device 801.

The measurement processing device 800 is a device for processing a captured image obtained by the measurement jig 600 to thereby measure a cut width or a gap width (to be described later). The measurement processing device 800 includes a CPU 802, a storage unit 803, an operation unit 804, an I/F unit 805, and an I/F unit 806.

The CPU 802 controls each block of the measurement processing device 800 and controls an operation of each of the cameras 601 to 603 of the measurement jig 600. Further, the CPU 802 executes a measurement processing program (to be described later) to calculate a cut width or a gap width, or to generate a confirmation screen.

The storage unit 803 stores the measurement processing program (to be described later) which is executed by the CPU 802. Further, the storage unit 803 temporarily stores a captured image received from each of the cameras 601 to 603, and stores a measurement result calculated by the CPU 802. The operation unit 804 is used to enable the user to input, for example, a selected operation for a confirmation screen (to be described later) or an execution instruction of the measurement processing.

The I/F (interface) unit 805 is a connection unit with the cables 611 to 613 of the respective cameras 601 to 603. The I/F (interface) unit 805 transmits a control signal generated by the CPU 802 to each camera, receives a captured image of each camera, and transfer the captured image to the storage unit 803.

The I/F (interface) unit 806 is a connection unit that is connected to the information processing device 801 through, for example, a USB cable. The (interface) I/F unit 806 transmits the measurement result or the captured image stored in the storage unit 803 to the information processing device 801. Further, the I/F (interface) unit 806 transmits the confirmation screen generated by the CPU 802. Further, although not illustrated, the I/F (interface) unit 806 is also used for the communication with the system controller 116 of the substrate processing system 100.

The information processing device 801 includes a display unit and a storage unit (not illustrated), and is constituted by, for example, a personal computer. The information processing device 801 receives the confirmation screen sent from the measurement processing device 800 via the I/F (interface) unit 806 and displays it on the display unit. Further, the information processing device 801 stores the captured image or the measurement result, which is sent from the measurement processing device 800, in the storage unit.

Figure 9:
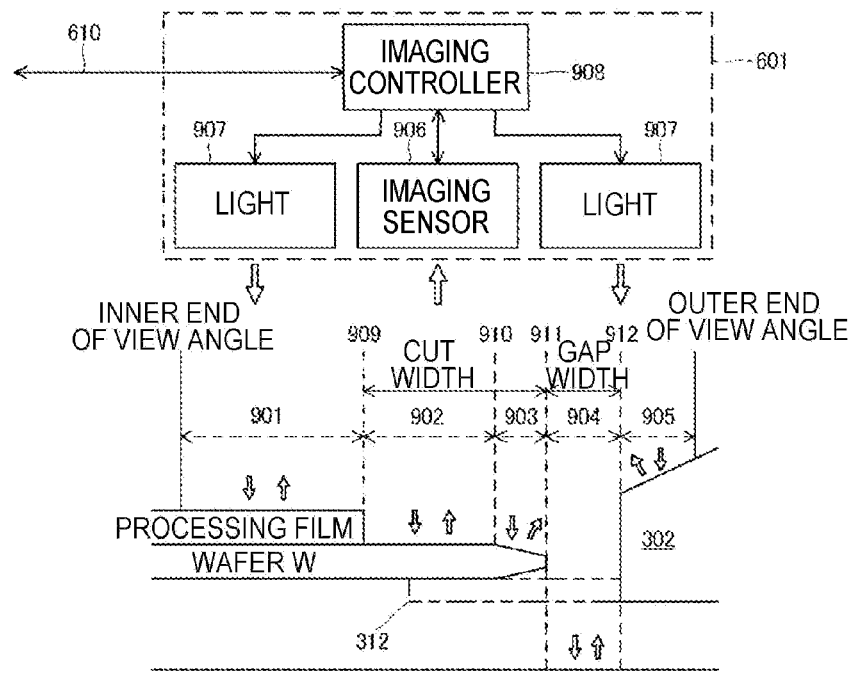
FIG. 9 is a view illustrating an arrangement relationship among a first camera 601, the substrate processing apparatus 111, and a wafer W.

An arrangement relationship among the first camera 601, the substrate processing apparatus 111, and the wafer W will be described with reference to FIG. 9. As illustrated, the wafer W has a round in the peripheral edge portion. A processing film is formed on the top surface of the wafer W, and the processing film is removed (cut) only in the peripheral edge portion is removed (cut). Meanwhile, it is assumed that the wafer W has a diameter of 300 mm, and there is no error in the circumferential direction. Further, the peripheral edge portion of the bottom surface of the wafer W is held from the lower side by the support pins 312 provided in the enclosure member 302. FIG. 9 illustrates a cross-sectional view of a location that is not supported by the support pins 312, in the peripheral edge portion of the wafer W. Therefore, a gap is present between the wafer W and the enclosure member 302.

When the measurement jig 600 is properly installed, an inner end (left end) of a horizontal imaging view angle of the first camera 601 is positioned on the processing film of the wafer W, and an outer end (right end) of the horizontal imaging view angle is positioned on the enclosure member 302. Therefore, a processing region 901, a cut surface region 902, a round region 903, a gap region 904, and an enclosure member region 905 are present in the image captured by the camera 601, in this order from the inner end (left end) of the view angle. Here, the processing film region 901 refers to a region where the formed processing film remains as it is without being removed by an etching. The cut surface region 902 refers to a flat region that does not include the round formed in the peripheral end of the wafer W, among the regions where the formed processing film is removed. The round region 903 refers to a round region where the processing film is removed or no processing film is formed from the beginning. The gap region 904 refers to a region formed between the peripheral edge end of the wafer W and the enclosure member 302. The enclosure member region 905 refers to a region where the enclosure member 302 exists. And, the cut width refers to a width of a region where the processing film is not present (a region where the processing film is removed or no processing film is formed from the beginning), which includes the cut surface region 902 and the round region 903 between the peripheral edge end of the processing film and the peripheral edge end of the wafer W in the peripheral end portion of the wafer W. In addition, the gap width refers to a width of the gap region 904 formed between the peripheral edge end of the wafer W and the enclosure member. Meanwhile, the width of the cut surface region 902 is referred to as a cut surface width, and the width of the round region 903 is referred to as a round width.

The first camera 601 includes an imaging sensor 906 and lights 907 at the positions corresponding to the openings 605a illustrated in FIG. 6. In the present exemplary embodiment, the imaging sensor is a CCD sensor with an effective pixel region of about 2 million pixels which is formed of 1,600 pixels×1,200 lines. The imaging sensor generates only a signal corresponding to a luminance signal according to a light-receiving level. A focus adjustment mechanism and an exposure adjustment mechanism (not illustrated) are provided in front of the surface of the imaging sensor 906. Each light 907 irradiates a white light to the wafer W, and has a strong directivity in a direction perpendicular to the plane of the wafer W, as indicated by the arrow. An imaging controller 908 controls the imaging sensor 906 and the lights 907 to capture an image of a subject viewed at the view angle, so that a captured image composed of an 8-bit luminance signal having a pixel number of 1,600 pixels×1,200 lines is generated.

As described later, the main purpose of the first camera 601 is to precisely image a processing film boundary 909, a cut surface boundary 910, a wafer peripheral edge end 911, and an enclosure member boundary 912. Thus, the imaging controller 908 may change an imaging condition based on a control signal received from the measurement processing device 800 via the cable 611 and cause the first camera 601 to perform imaging. Meanwhile, the second camera and the third camera have the same configuration.

Descriptions will be made on a confirmation screen output to a display unit of the information processing device 801, and a correspondence relationship between a captured image on the confirmation screen and an imaging position of the wafer W, with reference to FIGS. 10A and 10B.

Figure 10A:
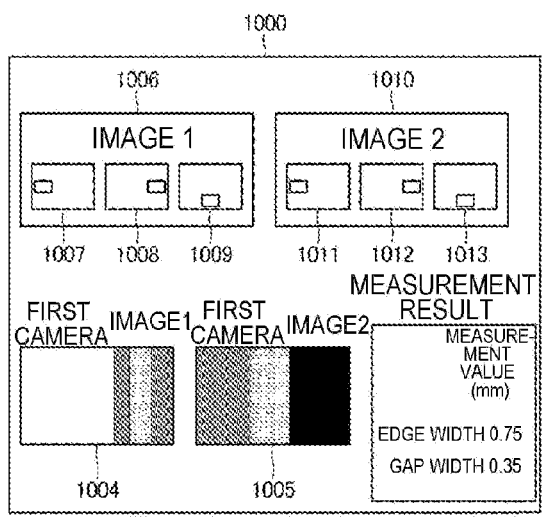
FIGS. 10A and 10B are views illustrating a confirmation screen and a correspondence relationship between a captured image on the confirmation screen and an imaging position of the wafer W.

FIG. 10A is a view illustrating a confirmation screen 1000 displayed on the information processing device 801. FIG. 10B is a view illustrating imaging view angles of the first to third cameras 601 to 603 and a display region on the confirmation screen 1000.

Figure 10B:
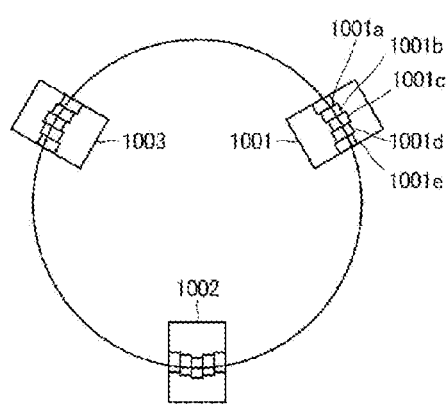

In FIG. 10B, the imaging view angle of the first camera 601 is denoted by reference numeral 1001, the imaging view angle of the second camera 602 is denoted by reference numeral 1002, and the imaging view angle of the third camera 603 is denoted by reference numeral 1003.

For the measurement of the cut width and the gap width, the measurement processing device 800 does not use the captured image of the whole view angle, but uses an image obtained by cutting a part out of the captured image. For example, in the case of the first camera 601, captured images cut out of the imaging view angle at five regions 1001a, 1001b, 1001c, 1001d, and 1001e, of which the positions are adjusted along the boundary of the wafer W, in the view angle 1001, is used for the measurement. The size of the cut captured images is, for example, 320×240 pixels. In the case of the second camera 602 and the third camera 603, the images obtained in the same manner as that in the first camera 601 are used.

Further, in the present exemplary embodiment, as described later, for each of the imaging view angles 1001 to 1003, two captured images are acquired under a first imaging condition and a second imaging condition, respectively.

In FIG. 10A, a display window 1004 refers to a region for displaying a captured image (image 1) cut out from any one of the five regions 1001a to 1001e, as a captured image obtained under the first imaging condition. Similarly, a display window 1005 refers to a region for displaying a cut captured image (image 2) obtained under the second imaging condition. The user may sequentially switch a captured image to be displayed, which is cut out of any of the five regions 1001a to 1001e, by performing clicking on the display window by a curser using a mouse provided in the operation unit 804.

In an operation region 1006, icons 1007 to 1009 are placed in order to select which camera image is to be displayed on the display window 1004. When the user moves the cursor using the mouse of the operation unit 804 and selects any one of the icons by clicking, a cut captured image from a camera corresponding to the selected icon is displayed on the display window 1004. An operation region 1010 and icons 1011 to 1013 also have the same functions as the operation region 1006 and the icons 1007 to 1009, and a selected result is reflected on the display window 1005.

Even while the measurement processing device 800 does not calculate the cut width or the gap width, the respective cameras 601 to 603 operate to perform imaging at a frequency of, for example, 5 frames/second and transmit the captured image to the measurement processing device 800. Since the measurement processing device 800 updates the confirmation screen 1000 based on the received captured image and transmits the updated confirmation screen 1000 to the information processing device 801, the user may visually confirm the current imaging status of the wafer W in real time. In the present exemplary embodiment, a timing of starting the measurement operation is determined by a start button provided in the operation unit 804. However, a specification may be available in which the start button is displayed on the confirmation screen 1000 and the measurement operation is started by clicking the button.

<Measurement Operation>

Figure 11:
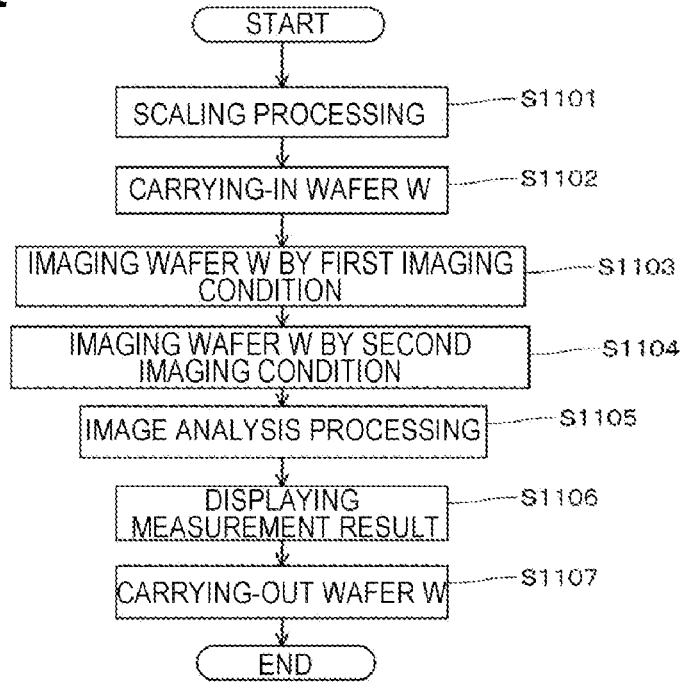
FIG. 11 is a flowchart for explaining a measurement operation of a cut width and a gap width in the first exemplary embodiment.

Next, descriptions will be made on the measurement operation of the cut width and the gap width, which is performed in cooperation by the respective apparatuses of the present exemplary embodiment, with reference to the flowchart of FIG. 11. The measurement operation in the flowchart is achieved when the CPU 802 of the measurement processing device 800 executes the measurement processing program stored in the storage unit 803.

Before the measurement operation illustrated in the flowchart is started, the substrate processing system 100 is shifted to a maintenance mode and prepares for the measurement. In the maintenance mode, the substrate processing apparatus 110 and the substrate processing apparatus 111 do not perform a processing on a wafer W according to a normal recipe. Meanwhile, an operation of moving or holding the wafer W in each apparatus, or an operation of moving the wafer W in the substrate processing system 100 may be performed automatically or manually.

The user of the substrate processing system 100 changes the system to the maintenance mode by operating the operation panel 117. Then, the user opens the maintenance panel 118 of the substrate processing apparatus 111 is opened, and installs the measurement jig 600 in the substrate processing apparatus 111 inside the processing chamber in the aspect illustrated in FIG. 7. Here, the user places a scaling wafer (not illustrated) at a position where the wafer W is placed in FIG. 3. The scaling wafer is intended to measure a correspondence relationship between a pixel number of a captured image obtained by a camera and a length [mm] of the plane on which the wafer W is placed. A scale or a structure indicating, for example, a 1 mm width is added to the scaling wafer. After the scaling wafer is placed, the user closes the maintenance panel 118. The user connects each of the measurement jig 600, the measurement processing device 800, and the information processing device 801 to activate and set them in a measurable state. Thus, preliminary preparation is completed. Then, the measurement operation is started by sending an instruction from the operation unit 804 of the measurement processing device.

First, a scaling processing is performed using the scaling wafer placed at a holing position of the wafer W in the substrate processing apparatus 111 (step S1101). Specifically, the CPU 802 of the measurement processing device 800 controls the first camera 601 of the measurement jig 600 to capture an image of the scaling wafer placed at the holding position of the wafer W in the substrate processing apparatus 111. The captured image is sent from the first camera 601 to the storage 803 via the cable 611 and the I/F unit 805, and stored therein. The CPU 802 determines how many pixels the scale indicating a 1 mm width corresponds to, by image analysis of the captured image. For example, if the scale is black, the pixel number may be determined by checking a distance of black line pixels. Here, the CPU 802 determines that the pixel number is 20, and stores a value of "scaling value"=20 pixels/mm in the storage unit 803. When the above operation is completed, the controller 116 of the substrate processing system 100 causes the lift pin plate 319 to move up, and the conveyance mechanism 113 to carry the scaling wafer out from the substrate processing apparatus 111 and store the scaling wafer in a predetermined storage location.

Next, the controller 116 of the substrate processing system 100 controls the conveyance mechanism 113 such that a wafer W, which is a target for measuring the cut width, is carried into the substrate processing apparatus 111 (step S1102). In the present exemplary embodiment, the wafer W is placed on the carrier placing unit 101 in advance, and the conveyance mechanism 113 carries the wafer W, which has been carried in through the delivery unit 103 in advance, into the substrate processing apparatus 110. Then, after the processing film of the peripheral edge portion is removed in the substrate processing apparatus 110, the conveyance mechanism 113 takes out the wafer W from the substrate processing apparatus 110 and carries the wafer W into the substrate processing apparatus 111. The controller 116 starts a conveyance operation in response to the carry-in instruction that the user operates with the operation panel 117. However, the operation may be started in response to the completion instruction of step S1101, which is received from the CPU 802 of the measurement processing device 800 via the I/F unit 806. After the wafer W is carried into the substrate processing apparatus 111, the lift pin plate 319 is moved up, and the wafer W is delivered from the wafer holding arm 114 of the conveyance mechanism 113 to the lift pins 319a of the lift pin plate 319. Then, the lift pin plate 319 is moved down while holding the received wafer W, delivers the wafer W to the support pins 312, and returns to the original position. When a series of operations are completed, the lift pin plate 319 is brought into the arrangement state illustrated in FIG. 3, and the arrangement relationship among the first camera 601, the substrate processing apparatus 111, and the wafer W is brought into the state illustrated in FIG. 9.

After the wafer W is placed, the imaging of the wafer W under the first imaging condition is performed (step S1103). Here, the CPU 802 of the measurement processing device 800 first transmits a control instruction to each of the cameras 601 to 603 so as to perform the imaging operation under the first imaging condition. The imaging controller 908 of each of the cameras 601 to 603, which has received the control instruction, controls the imaging sensor 906 and the lights 907 so as to capture an image under the first imaging condition, thereby performing the imaging. The imaging controller 908 converts a signal obtained by the imaging of the imaging sensor 906 into a captured image of a 1 frame luminance signal and transmits the captured image to the measurement processing device 800. The captured image transferred to the measurement processing device 800 is stored in the storage unit 803. Here, the content of the first imaging condition and the actual state of the captured image will be described later.

After the imaging is performed under the first imaging condition, the imaging of the wafer W is performed under the second imaging condition (step S1104). The operations herein are the same as those in step S1103, and the content of the second imaging condition and the actual state of the captured image will be described later.

After the imaging is performed under the first and second conditions, the CPU 802 of the measurement processing device 800 performs an image analysis processing of the first captured image by the first imaging condition and the second captured image by the second imaging condition, which are stored in the storage unit 803, and obtains the cut width and the gap width as the measurement result (step S1105). The image analysis processing will be described later in detail.

When the measuring processing is completed, the CPU 802 of the measurement processing device 800 displays the measurement result (step S1106). In the present exemplary embodiment, the CPU 802 generates a display screen including information of the first captured image obtained by the first imaging condition, the second captured image obtained by the second imaging condition, the cut with, and the gap width, and transmits the generated display screen to the information processing device 801 via the I/F unit 806. Meanwhile, the CPU 802 also transmits the first captured image and the second captured image themselves to the information processing device 801. The information processing device 801 performs the screen display on the display unit in the aspect illustrated in FIG. 10, based on the received display screen, and stores the received first and second captured images in a storage unit (not illustrated).

When the measurement result is displayed, the lift pin plate 319 is moved up to support the wafer W from the lower side, and delivers the waver W to the wafer holding arm 114. The conveyance mechanism 113 carries the wafer W out from the substrate processing apparatus 111. The substrate, which has been carried out, is returned to the carrier placing unit 101 through the delivery unit 103 (step S1107). The controller 116 starts a conveyance operation in response to the carry-out instruction that the user operates with the operation panel 117. However, the conveyance operation may be automatically performed without going through the user's instruction. For example, the measurement processing device 800 may perform notification at a timing when any one of steps S1104 to S1106 has been performed, and then, the controller 116 may cause step S1107 to be performed upon receiving the notification.

The foregoing description corresponds to the measurement operation performed on one wafer W in the present exemplary embodiment, and the same operation is repeated with respect to the next wafer W placed on the carrier placing unit 101.

<Imaging Operation and Image Analysis Processing>

Next, detailed descriptions will be made on the imaging operation and the image analysis processing at steps S1103 to S1105.

The information to be measured in the present exemplary embodiment includes the cut width of the wafer W and the gap width between the edge portion of the peripheral edge portion of the wafer W and the enclosure member 302. Referring to the relationship of FIG. 9, the values may be calculated by Equations (1) and (2) below.

Cut width [mm]=width [mm] of cut surface region 902+width [mm] of round region 903   Equation (1)

Here,

Width [mm] of cut surface region 902=(position [pixels] of cut surface boundary 910−position [pixels] of processing film boundary 909)/scaling value [pixels/mm]

Width [mm] of round region 903=(position [pixels] of wafer peripheral edge end 911−position [pixels] of cut surface boundary 910)/scaling value [pixels/mm]

Gap width [mm]=(position [pixels] of enclosure member boundary 912−position [pixels] of wafer peripheral edge end 911)/scaling value [pixels/mm]   Equation (2)

In Equations (1) and (2) above, the "position [pixels]" means a count value of a horizontal pixel number from a left end of a view angle of a cut image. In the present exemplary embodiment, the horizontal pixel number of the cut image is 320, a value of 1 to 320 may be taken as the "position [pixels]".

In the present exemplary embodiment, as illustrated in FIG. 10B, five regions are extracted from one captured image, a cut width and a gap width are calculated for each of the five regions, and the average values thereof are regarded as a final cut width value and a gap with in each region, respectively.

In order to calculate the cut width and the gap width as in Equations (1) and (2), it is necessary to specify four boundary positions, including (a) a position of the cut surface boundary 910, (b) a position of the processing film boundary 909, (c) a position of the wafer peripheral edge end 911, and (d) a position of the enclosure member boundary 912, from a change amount in luminance level (luminance edge amount) of the pixels of the captured image. Here, the luminance edge amount may be obtained through a method of determining a peak value from an absolute value of a difference in luminance value between adjacent pixels, or a method of applying a known edge filter to an image.

The wafer W and the respective regions 901 to 905 of the substrate processing apparatus in the present exemplary embodiment have a reflection characteristic peculiar to the material thereof or a reflection characteristic peculiar to the structure thereof. In a case where irradiation light having the same illuminance is incident from the lights 907, for example, by a difference in material, the cut surface region 902 has a reflected light level (light grey) higher than a reflected light level (grey) of the processing film region 901. Meanwhile, the cut surface region 902 and the round region 903 are the same in material. However, since the round region 903 is inclined, the reflected light level to the direction of the imaging sensor 906 is low (close to black). Further, similarly, since the enclosure member region 905 is also inclined, the reflected light level is low (close to black). Since a reflective surface of the gap region 904 is a bottom surface, attenuation is generated, but the gap region 904 has a certain degree of reflected light level (grey close to black).

Consequently, the reflected light level received by the imaging sensor 906 is higher in the cut surface region 902, the processing region 901, the gap region 904, the enclosure member region 905, and the round region 903 in this order.

As such, in the present exemplary embodiment, in a case where irradiation lights having the same illuminance are incident from the lights 907, the width of the reflected light level becomes very wide. Thus, in the imaging sensor 906 having a dynamic range of a normal width, it is impossible to capture an image such that the reflected light level in all the regions becomes a proper luminance level. In addition, since a precise luminance edge cannot be calculated from a captured image that does not have a proper luminance level, an error is generated in specifying four boundary positions (a) to (d).

The present exemplary embodiment solves the above-mentioned problems by preparing the first imaging condition and the second imaging condition, which are different from each other in conditions relating to brightness, in advance, and performing imaging twice using the first imaging conditions and the second imaging condition, at the time of imaging. For convenience, the second imaging condition and the second captured image are first described.

The second imaging condition is set as an imaging condition with emphasis on a reflected light level of intermediate illuminance such that the position of the processing film boundary 909 (b) is precisely specified by acquiring a relatively bright captured image. That is, when the reflected light level is converted into a luminance signal, a broad gradation is assigned with an illuminance level that includes the reflected light level from the processing film region or the reflected light level form the cut surface region. Specifically, it may be adjusted by, for example, setting a sensitivity of the CCD (e.g., ISO sensitivity), or setting a light-receiving time of the CCD by an exposure adjustment mechanism (not illustrated).

Here, since the second imaging condition puts emphasis on the reflected light level of intermediate illuminance, the reproducibility of the reflected light level of low illuminance becomes low. That is, since a narrow gradation is assigned with an illuminance level that includes the reflected light levels from the gap region 904, the enclosure member region 905, and the round region 903, all the regions appear as an image of color close to black.

Figure 12:
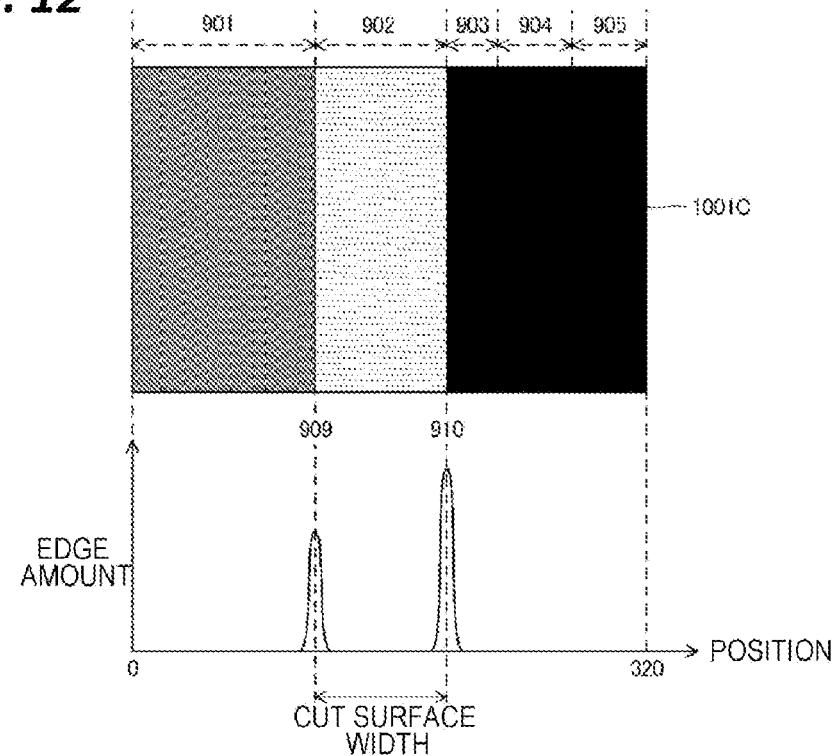
FIG. 12 is a schematic view illustrating a second captured image that is captured under a second imaging condition.

FIG. 12 illustrates a schematic view of the second captured image that is captured under the second imaging condition. Since the gradation is sufficiently maintained in the luminance signal levels of the processing film region 901 and the cut surface region 902, the change in luminance level of the pixels of the two regions, that is, the luminance edge may be easily detected, so that the position of the processing film boundary 909 (b) may be precisely specified. Meanwhile, the position of the cut surface boundary 910 (a) may also be precisely specified. On the other hand, the gap region 904, the enclosure member region 905, and the round region 903 are all positioned at a low luminance signal value (substantially black). Thus, the detection of the luminance edge is difficult, so that the position of the wafer peripheral edge end 911(c) and the position of the enclosure member boundary 912 (d) cannot be specified.

In the present exemplary embodiment, the position of the wafer peripheral edge end 911 (c) and the position of the enclosure member boundary 912 (d) are specified from the first captured image, which is relatively dark and is captured under the first imaging condition that is the other imaging condition.

The first imaging condition is set as an imaging condition with emphasis on a reflected light level of low illuminance. That is, when the reflected light level is converted into a luminance signal, a broad gradation is produced with an illuminance level that includes the reflected light levels from the gap region 904, the enclosure member region 905, and the round region 903. Specifically, it may be adjusted by, for example, setting a sensitivity of the CCD (e.g., ISO sensitivity) to a higher sensitivity that that of the second imaging condition, or setting a light-receiving time of the CCD to a longer period of time than that of the second imaging condition.

Here, since the first imaging condition puts emphasis on the reflected light level of low illuminance, the reproducibility of the reflected light level of intermediate illuminance becomes low. That is, since a narrow gradation is produced with an illuminance level that includes the reflected light levels from the processing film region 901 and the cut surface region 902, the regions appear as an image of color substantially close to white.

FIG. 13 illustrates a schematic view of the first captured image that is captured under the first imaging condition. Since the gradation is sufficiently maintained in the luminance signal levels of the gap region 904, the enclosure member region 905, and the round region 903, the luminance edge may be easily detected, so that the position of the wafer peripheral edge end 911 (c) and the position of the enclosure member boundary 912 (d) may be precisely specified. On the other hand, the processing film region 901 and the cut surface region 902 are all positioned at a high luminance signal value (substantially white). Thus, the detection of the luminance edge is difficult, so that (b) the position of the processing film boundary 909 cannot be specified.

As described above, when two images, that is, the first captured image based on the first imaging condition and the second captured image based on the second imaging condition are used, the position of the cut surface boundary 910 (a), the position of the processing film boundary 909 (b), the position of the wafer peripheral edge end 911 (c), and the position of the enclosure member boundary 912 (d) may be precisely determined.

The CPU 802 calculates the cut width and the gap width by applying the position information (a) to (d) to Equations (1) and (2). The cut width and the gap width are also calculated with respect to other cut images 1001a, 1001b, 1001d, and 1001e in the same manner, and those obtained by averaging the values are determined as the final cut width and gap width obtained by the captured image 1001.

Since the wafer W usually has a notch in a part of the peripheral edge, there is a possibility that glare occurs in any one of the cut images 1001a to 1001e. In that case, the final cut width and gap width may be determined by performing an averaging processing using the cut images except the value of the glare-occurring cut image. Determination whether it is a glare-occurring image may be performed by a known image recognition that recognizes a notch shape, or it may be simply estimated that the image having an abnormal value obtained as the cut width or the gap width corresponds to an image including a notch.

The "measurement result" in the display screen 1000 illustrated in FIG. 10 is a region for notifying the final cut width and the gap width determined by the captured image 1001, and shows an example in which the cut width is 0.75 mm and the gap width is 0.35 mm.

The measurement values are not only displayed on the screen, but also listed in a text file in a list format, and stored in the storage unit of the information processing device 801. The captured image is converted to a file in a bitmap format, and also stored in the storage unit. In the text file, the measurement values may be listed in association with information specifying a corresponding wafer ID or image file.

<Use of Measurement Result>

The measurement result obtained in the present exemplary embodiment is used, for example, as follows. In a case where the wafer W is processed by the substrate processing apparatus 110, the cut width is used as information for adjusting a position of the chemical liquid nozzle 208 of the substrate processing apparatus. The user of the system may finely adjust, for example, the chemical liquid nozzle 208 based on the difference value between a preset cut width and a cut width obtained by an actual measurement.

The gap width is used as information for adjusting a central position in the delivery of the wafer W from the conveyance mechanism 113 to the lift pin plate 319. When the measurement jig 600 is properly attached to the substrate processing apparatus 111, the imaging view angles of the first to third cameras 601 to 603 are positioned equidistantly and 120 degrees apart from each other in the circumferential direction, on the basis of the central position of the substrate processing apparatus 111 (the central position of the substrate lifting member 305). Accordingly, the central position of the wafer W when it is actually placed on the support pin 312 may be obtained by calculation from three gap widths. In addition, the position adjustment in the delivery of the wafer W from the conveyance mechanism 113 to the lift pin plate 319 may be performed based on the difference value between the central position of the substrate processing apparatus 111 and the central position of the wafer when it is actually placed.

Effect of Present Exemplary Embodiment

As described above, according to the present disclosure, in the substrate processing apparatus 111, the cut width in the wafer W and the gap width between the peripheral edge end of the wafer W and the enclosure member 302 are measured by imaging the wafer W in which the processing film of the peripheral edge portion is removed and the enclosure member 302 from the upper side of the enclosure member 302, and processing the captured image. Therefore, it is unnecessary to individually provide an imaging mechanism for confirming the cut width in the wafer W and an imaging mechanism for confirming the holding state of the enclosure member 302, and it is also unnecessary to form individual imaging sequences. Accordingly, it is possible to confirm the film removal state of the substrate and the holding state of the enclosure member 302 in a short time without causing the enlargement of the system.

Further, according to the present exemplary embodiment, the cut width and the gap width are measured by specifying the processing film boundary 909, the cut surface boundary 910, the wafer peripheral edge end 911, and the enclosure member boundary 912. Accordingly, it is possible to measure the cut width that reflects the round width. In this case, the wafer peripheral edge end 911 and the enclosure member boundary 912 are specified from the first captured image, which is relatively dark, obtained by the first imaging condition. Further, the cut surface boundary 910 and the processing film boundary 909 are specified from the second captured image, which is relatively bright, obtained by the second imaging condition. Thus, since the error is reduced when specifying each boundary or edge, the cut width and the gap width may be precisely measured. Further, after the measurement processing, the first and second captured images and the measured processing region width and gap width are displayed on the display screen. Accordingly, after the captured image is visually confirmed, the user can know the values of the processing region width and the gap width, and thus, easily make a quality determination of the measurement result.

In the present exemplary embodiment, the substrate processing apparatus 111 is an apparatus for processing the bottom of a wafer W. The wafer W (a wafer W having a peripheral edge portion in which the processing film is removed) to be held by the enclosure member 302 is carried into the first substrate processing apparatus from the outside. Thus, a need for individually providing an imaging mechanism for confirming the cut width in the wafer W and an imaging mechanism for confirming the holding state of the enclosure member 302, is eliminated. Further, since the processing of the peripheral edge portion of the film-formed wafer W is performed in the substrate processing apparatus 110, and then, the conveyance sequence of carrying the wafer W as it is into the substrate processing apparatus 111 is performed, a process from the actual processing of the peripheral edge portion to the confirmation of the processing may be performed in a short time.

In the present exemplary embodiment, in a state where the measurement jig 600 is properly installed in the substrate processing apparatus 111, an image for measuring the cut width and the gap width may be captured by the first to third cameras 601 to 603. By taking a manner of a detachable jig from the apparatus, it is unnecessary to constantly install a camera even in the substrate processing apparatus 111, and enlargement of the system is not caused. Further, even though the measurement jig 600 is installed, the substrate processing apparatus 111 moves up to a position that is higher than the enclosure member 302 and lower than the first to third cameras 601 to 603 so as to receive the wafer W carried in from the outside, and moves down from the receiving position so as to place the wafer W on the enclosure member 302. Accordingly, the cut width and the gap width may be successively measured with respect to a plurality of wafers W.

Modification of First Exemplary Embodiment

The cut width of the wafer W may be calculated by using Equation (1)' below without being limited to using Equation (1) above.

Cut width [mm]=(position [pixels] of wafer peripheral edge end 911−position [pixels] of processing film boundary 909)/scaling value [pixels/mm]   Equation (1)'

The above equation is effective in a case where it is unnecessary to individually determine the round width, that is, it is unnecessary to specify the position of the cut surface boundary 910.

Second Exemplary Embodiment

In the first exemplary embodiment, the measurement jig 600 includes the first to third cameras 601 to 603, and a plurality of captured images corresponding to a plurality of positions in the wafer W is obtained by using the plurality of cameras. In the present exemplary embodiment, descriptions will be made on an example in which a plurality of captured images corresponding to a plurality of positions in the wafer W is acquired by using a single camera such that the measurement processing of the cut width and the gap width is performed.

A shape of a measurement jig of the present exemplary embodiment will be described with reference to FIGS. 14A to 14C. A measurement jig 1400 illustrated in FIG. 14A includes only a camera 1401 as an imaging device. A support member 1402 is equipped with the camera 1401 on its top surface. Although not illustrated, similarly to the measurement jig 600 of the first exemplary embodiment, the support member 1402 includes an opening at a position corresponding to an imaging sensor and lights of the camera 1401. A mounting table 1403 is coupled to the support member 1402 equipped with the camera 1401, on its front surface. Further, the rear surface of the mounting table 1403 serves as a mounting surface to be mounted on the bottom surface of the processing chamber. The camera 1401 has the same configuration as the first to third cameras described in the first exemplary embodiment, and is connected to a measurement processing device 800 having the same configuration as in the first exemplary embodiment, via a cable 1404. As in the first exemplary embodiment, there is provided an interval of a predetermined height H2 from the top surface of the mounting table 1403 to the rear surface of the support member 1402 so as to perform carry-in or carried-out of the wafer W even after the mounting. As described below, since the location of the mounting surface is different from that of the first exemplary embodiment, the height H2, including the height of the substrate processing apparatus 111 itself, is larger than the height H1. Meanwhile, the support member 1402 may be configured to be vertically movable as well as horizontally movable by a general structure (not illustrated), which makes the position adjustment of the camera 1401 easier. Further, in the case of the present exemplary embodiment, the camera 1401 may be equipped on the support member 1402 only at the time of the measurement, or constantly. Also, the support member 1402 may be installed in the processing chamber only at the time of the measurement, or constantly.

FIG. 14B is a schematic view when the measurement jig 1400 is installed on the bottom surface of the processing chamber in which the substrate processing apparatus 111 is accommodated. Unlike the first exemplary embodiment, the measurement jig 1400 is installed in the processing chamber but outside the substrate processing apparatus 111. Upon installation, a user fixes the measurement jig 1400 using a fitting tool so as not to move from the bottom surface of the processing chamber even during the measurement.

FIG. 14C is a plan view of a state of installation on the bottom surface of the processing chamber when viewed from the upper side. A relative position of the camera 1401 in relation to the substrate processing apparatus 111 and an imaging view angle of the camera 1401 with respect to the substrate processing apparatus 111 in the present exemplary embodiment, are the same as those of at least one camera among the first to third cameras illustrated in the first exemplary embodiment.

Figure 15:
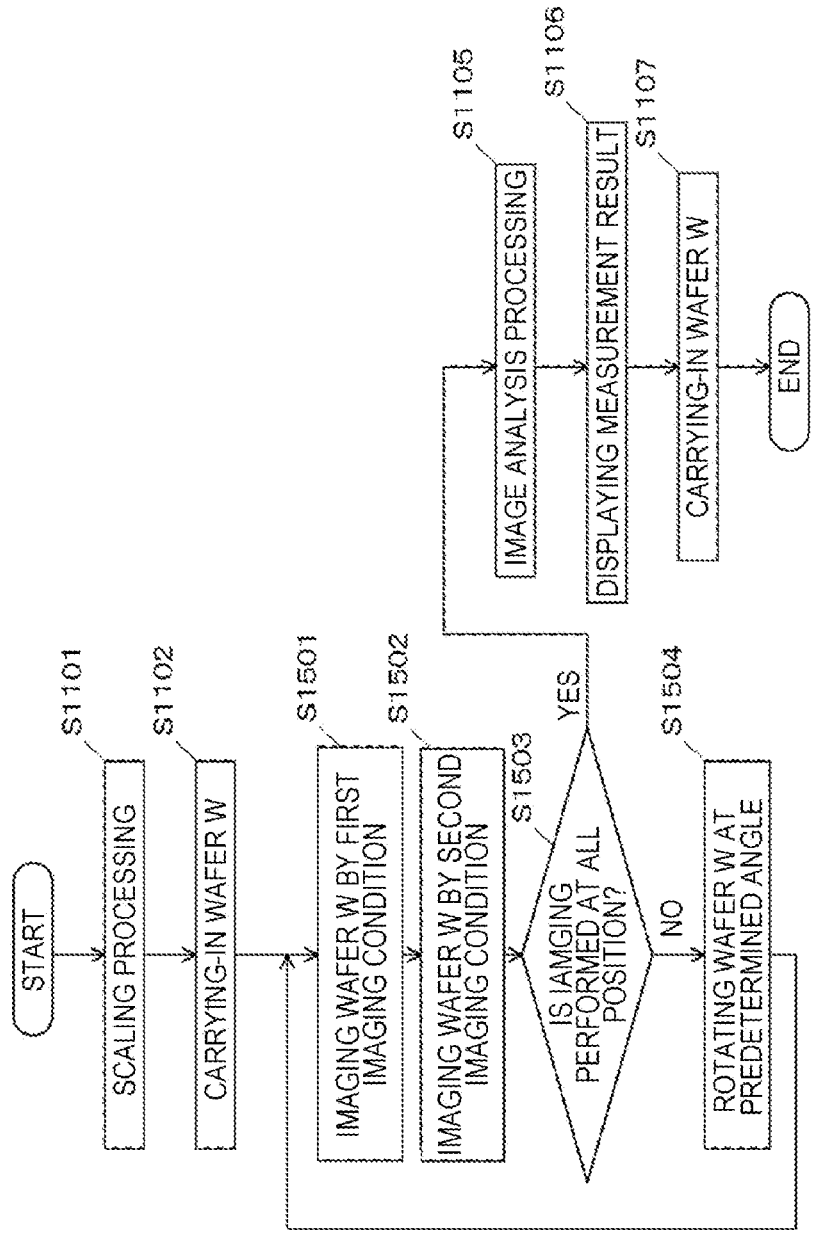
FIG. 15 is a flowchart for explaining a measurement operation of a cut width and a gap width in the second exemplary embodiment.

Next, descriptions will be made on the measurement operation of the cut width and the gap width, which is performed in cooperation by the respective apparatuses of the present exemplary embodiment, with reference to a flowchart of FIG. 15. The measurement operation in the flowchart is achieved when the CPU 802 of the measurement processing device 800 executes the measurement processing program stored in the storage unit 803.

In the present exemplary embodiment, steps S1101 and S1102, and S1105 to S1107 perform the same processing as in the steps described in the first exemplary embodiment.

In the present exemplary embodiment, after the wafer W is placed in step S1102, imaging of the wafer W is performed under the first imaging condition (step S1501). After the imaging under the first imaging condition, imaging of the wafer W is subsequently performed under the second imaging condition (step S1502). Here, the same operations as those in steps S1103 and S1104 described in the first exemplary embodiment are performed with only one camera 1401.

Next, it is determined whether the imaging is performed at all the preset positions (S1503). In the present exemplary embodiment, the imaging is performed at three locations including a position of the wafer W just below the camera 1401 when carried in at the very beginning, a position of the wafer W at the position rotated 120 degrees relative to the position, and a position of the wafer W at the position further rotated 120 degrees. That is, it is substantially the same as the first exemplary embodiment in that the imaging is performed at three positions of the wafer W. Here, since the imaging has been just performed at the position of the wafer W just below the camera 1401 when carried in at the very beginning, as yet (step S1503: No), the process proceeds to a rotation operation of step S1504.

The system controller 116 drives the rotation drive unit 304 to rotate the rotation plate 301 so that the wafer W held by the enclosure member 302 is rotated 120 degrees, thereby arranging the next imaging position just below the camera 1401 (step S1504).

When the rotation operation is completed, the process returns to step S1501, performs the same imaging operation and the rotation operation, and returns to step S1501 again. When the third imaging operation is completed, since the imaging is performed at all the positions (step S1503: Yes), the process proceeds to step S1105, and the same image analysis processing as in the first exemplary embodiment is performed by using three sets of the first captured image and the second captured image (step S1105). Since the subsequent process is the same as in the first exemplary embodiment, descriptions thereof will be omitted.

In the present exemplary embodiment, an example of imaging three positions of the wafer W has been described, but not limited thereto. More positions may be imaged and used in the subsequent processing. For example, in a case where six positions are imaged, in step S1504, a rotation operation of 60 degrees is performed at a time. As the number of imaging positions increases, more precise cut width and gap width may be obtained.

As described above, according to the present exemplary embodiment, a single camera 1401 is provided at a position along a peripheral edge direction of the wafer W, and the camera 1401 performs imaging at a plurality of positions of the wafer W in accordance with rotation of the enclosure member 302 so as to acquire a plurality of captured images to be processed by the measurement processing device 800. Accordingly, since it is unnecessary to provide a plurality of cameras as in the first exemplary embodiment, a space-saving measurement operation may be performed at a low cost, as compared with the first exemplary embodiment. Further, since more captured images can be used for the measurement by increasing the number of the imaging, measurement accuracy may be enhanced.

OTHER EXEMPLARY EMBODIMENTS

In the above-described exemplary embodiments, descriptions have been made on examples of using the detachable measurement jig 600 and measurement jig 1400 for the substrate processing apparatus, but the present disclosure is not limited thereto, and may be configured such that a camera is provided in advance in an upper portion within the substrate processing apparatus 111 and the imaging and the measurement processing are performed at a predetermined timing. Similarly, the measurement processing device 800 may not be provided as a separate body outside the substrate processing system, but the system controller 116 may be configured to have the same function. Further, the information processing device 801 may not be provided as a separate body, but the operation panel 117 may be configured to have the same function.

In the above-described exemplary embodiments, descriptions have been made on a case where the enclosure member 302 surrounds the entire periphery of the wafer W, but not limited to the entire periphery. A part thereof may surround the wafer W. In this case, a camera may be arranged at the position of the part of the enclosure member and performs the same imaging as in the above-described exemplary embodiments. Further, in the above-described exemplary embodiments, descriptions have been made on an example in which the imaging is performed twice by changing the imaging condition of the imaging sensor side. However, a plurality of captured images may be obtained by changing the irradiation level of the light side. Further, depending on the specification, the imaging may not be performed a plurality of times. For example, if there is a camera including an imaging sensor capable of expressing a brightness from a dark portion to a bright portion because the dynamic range is very wide, all edges may be obtained from a single captured image. Meanwhile, even in a case of a typical camera, if the measurement processing device 800 is equipped with an image processing software capable of performing a gradation correction processing, all edges may be obtained by producing an image corresponding to FIGS. 12 and 13 from a single captured image in some cases.

In the above-described exemplary embodiments, it has been described that the program for controlling the substrate processing system 100 is stored in a storage apparatus (not illustrated) included in the system controller 116, and the program for controlling the measurement processing system is stored in the storage unit 803 of the measurement processing device 800. Such a storage device is not limited to a memory such as, for example, a ROM or a RAM, or a hard disc, but may be configured with, for example, a disc type storage medium such as a CD-ROM, a DVD-ROM, or a flexible disc. Further, some or all of program to be stored may be configured to be executed in the system by receiving the program from an external server via a network (not illustrated).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A measurement processing device comprising:
a measurement processing controller configured to control an imaging device to capture an image including both a substrate on which a processing film is removed from a peripheral edge portion thereof to form a cut width thereon, and an enclosure member that surrounds the substrate while the substrate is supported from below by a support pin extended from a lower portion of an inner surface of the enclosure member that is vertically extended from below the substrate to above the substrate, the enclosure member having a surface inclined inwardly and downwardly from an upper surface to the inner surface of the enclosure member such that a reflected light level of the surface is lower than other portions,
wherein the captured image obtained by the imaging device is processed by the measurement processing controller to measure the cut width in which the processing film is absent in the peripheral edge portion of the substrate and a gap width formed between a peripheral edge end of the substrate and the inner surface of the enclosure member.

2. The measurement processing device of claim 1, wherein the cut width and the gap width are measured by specifying, from the captured image, at least a boundary between a first plane region on the substrate where the processing film is removed and a second plane region where the processing film remains, the peripheral edge end of the substrate, and the inner surface of the enclosure member.

3. The measurement processing device of claim 2, wherein the peripheral edge end of the substrate and the inner surface of the enclosure member are specified from a first captured image obtained by capturing under a first imaging condition of the imaging device, and a boundary between the first plane region where the processing film is removed and a round region of a beveled portion of the substrate, and the boundary between the first plane region where the processing film is removed and the second plane region where the processing film remains are specified from a second captured image obtained by capturing under a second imaging condition of the imaging device.

4. The measurement processing device of claim 3, wherein the second imaging condition is a condition to obtain a brighter image than the first imaging condition.

5. The measurement processing device of claim 3, wherein the measurement processing device causes the first and second captured images, and measurement values of the cut width and the gap width to be displayed on a display of an information processing device connected to the measurement processing controller.

6. The measurement processing device of claim 1, wherein a plurality of the imaging devices is provided at a plurality of positions along a peripheral edge direction of the substrate, and a plurality of captured images obtained by the plurality of imaging devices that perform imaging at the plurality of positions, respectively, are used for measurement.

7. The measurement processing device of claim 1, wherein the imaging device performs imaging at a plurality of positions of the substrate along a peripheral edge direction of the substrate in accordance with rotation of the enclosure member to acquire a plurality of captured images to be processed by the measurement processing controller.

8. A substrate processing system comprising:
a first substrate processing apparatus including an enclosure member that surrounds a substrate and configured to process the substrate enclosed by the enclosure member;
an imaging device provided above the enclosure member and configured to capture an image including both the substrate on which a processing film is removed from the peripheral edge portion to form a cut width and the enclosure member that surrounds the substrate while the substrate is supported from below by a support pin extended from a lower portion of an inner surface of the enclosure member that is vertically extended from below the substrate to above the substrate, the enclosure member having a surface inclined inwardly and downwardly from an upper surface to the inner surface of the enclosure member such that a reflected light level of the surface is lower than other portions; and
a measurement processing device configured to process the captured image obtained by the imaging device to thereby measure the cut width in which the processing film is absent in the peripheral edge portion of the substrate and a gap width formed between a peripheral edge end of the substrate and the inner surface of the enclosure member.

9. The substrate processing system of claim 8, wherein the first substrate processing apparatus is a device that processes a bottom surface of the substrate held by the enclosure member, and the substrate, on which the processing film is removed from the peripheral edge portion, is carried in from an outside of the first substrate processing apparatus.

10. The substrate processing system of claim 9, further comprising:
a second substrate processing apparatus configured to remove the processing film by supplying a processing liquid to the peripheral edge portion of the substrate on which the processing film is formed,
wherein the second substrate processing apparatus removes the processing film from the peripheral edge portion and the substrate is then carried into the first substrate processing apparatus.

11. The substrate processing system of claim 9, wherein the first processing apparatus further includes a lifting member that liftably supports the substrate from the bottom surface, and
the lifting member moves up to a position that is higher than the enclosure member and lower than the imaging device to thereby receive the substrate that is carried in from the outside of the first processing apparatus, and moves down from the receiving position after receiving the substrate to thereby place the substrate on the enclosure member.

12. The substrate processing system of claim 8, wherein a plurality of the imaging devices is provided at a plurality of positions along a peripheral edge direction of the substrate, and the plurality of imaging devices perform capturing at the plurality of positions, respectively, to acquire a plurality of captured images to be processed by the measurement processing device.

13. The substrate processing system of claim 8, wherein the imaging device performs capturing at a plurality of positions of the substrate along a peripheral edge direction of the substrate in accordance with rotation of the enclosure member to acquire a plurality of captured images to be processed by the measurement processing device.

14. A measurement jig for use in a substrate processing apparatus, the measurement jig comprising:
a mounting table having a mounting surface configured to be mounted on a substrate processing apparatus including an enclosure member that surrounds an entire peripheral edge portion of a substrate while the substrate is supported from below by a support pin extended from a lower portion of an inner surface of the enclosure member that is vertically extended from below the substrate to above the substrate; and
an imaging device fixed on the mounting table and connected to a measurement processing device, the imaging device being configured to capture an image including both a peripheral edge portion of the substrate and a portion of the enclosure member that has a surface inclined inwardly and downwardly from an upper surface to the inner surface of the enclosure member such that a reflected light level of the surface is lower than other portions, and the peripheral edge portion of the substrate being formed with a cut width in which a processing film is removed,
wherein the imaging device is configured to transmit the captured image to the measurement processing device such that the cut width formed in the peripheral edge portion of the substrate and a gap width formed between a peripheral edge end of the substrate and the inner surface of the enclosure member are measured, in a state where the substrate is held by the enclosure member and the mounting table is fixed to the substrate processing apparatus.

15. The measurement jig of claim 14, wherein the mounting table and the imaging device are spaced apart from each other at least to the extent that a lifting member provided in the substrate processing apparatus receives the substrate carried in from the outside of the substrate processing apparatus and moves down after receiving the substrate to place the substrate on the enclosure member.

16. The measurement jig of claim 14, wherein a plurality of the imaging devices are provided at a plurality of positions of the mounting table along a peripheral edge direction of the substrate, respectively.

17. The measurement jig of claim 14, wherein the imaging device is provided at a single position of the mounting table.

18. A measurement processing method comprising:
installing a measurement jig equipped with an imaging device above an enclosure member that surrounds a substrate while the substrate is supported from below by a support pin extended from a lower portion of an inner surface of the enclosure member that is vertically extended from below the substrate to above the substrate, the enclosure member having a surface inclined inwardly and downwardly from an upper surface to the inner surface of the enclosure member such that a reflected light level of the surface is lower than other portions and the substrate including a cut width on a peripheral edge portion thereof in which a processing film is removed;
capturing by the imaging device an image including both the peripheral edge portion of the substrate and a portion of the enclosure member from above the enclosure member; and
measuring the cut width of the substrate formed between, a boundary position between a first plane region where the processing film is removed and a second plane region where the processing film remains, and a position of a peripheral edge end of the substrate, and a gap width formed between the peripheral edge end of the substrate and the inner surface of the enclosure member based on the image captured at the capturing.

19. The measurement processing method of claim 18, wherein, in the capturing, the measurement jig is provided with a plurality of imaging devices each positioned at a plurality of positions along a peripheral edge direction of the substrate to obtain a plurality of images to be processed for the measuring.

20. The measurement processing method of claim 18, wherein the capturing captures a plurality of captured images by performing capturing at a plurality of positions of the substrate in accordance with rotation of the enclosure member by using the imaging device provided at a single position of the measurement jig.

21. A non-transitory computer-readable storage medium having stored therein with a program that cause a computer to execute the measurement processing method of claim 18.

* * * * *